United States Patent [19]

Zeevi et al.

[11] Patent Number: 4,858,014

[45] Date of Patent: Aug. 15, 1989

[54] RANDOM SCAN SYSTEM

[75] Inventors: Yehoshua Zeevi; Oliver Hilsenrath, both of Haifa, Israel

[73] Assignee: Technion Research & Development Foundation Ltd., Technion City, Israel

[21] Appl. No.: 64,088

[22] Filed: Jun. 18, 1987

[30] Foreign Application Priority Data

Jul. 21, 1986 [IL] Israel ......................................... 79485

[51] Int. Cl.⁴ ............................................. H04N 5/228
[52] U.S. Cl. ..................................... 358/217; 358/125; 358/209; 358/903
[58] Field of Search ................. 358/209, 217, 903, 125

[56] References Cited

U.S. PATENT DOCUMENTS

| | | | |
|---|---|---|---|
| 3,818,445 | 6/1974 | Neville | 382/48 |
| 4,571,638 | 2/1986 | Schneider | 358/903 |
| 4,740,839 | 4/1988 | Phillips | 358/217 |

Primary Examiner—Howard W. Britton
Attorney, Agent, or Firm—Frishauf, Holtz, Goodman & Woodward

[57] ABSTRACT

A two-dimensional video data acquisition system comprising: video detector apparatus for scanning a visual scene; controller apparatus for generating scan pattern instructions; system interface apparatus for selecting at least one scan pattern for acquisition of video data from the visual scene, the scan pattern being selected from a plurality of such patterns in accordance with the scan pattern instructions; and scan-video interface apparatus comprising random scan driver apparatus for generating scan control signals in accordance with the selected scan pattern, the video detector apparatus scanning the visual scene in accordance with the scan control signals to provide an output to the system interface such that an intensity data map is stored therein, the controller apparatus performing data processing of the intensity data map in accordance with a predetermined set of video data characteristics.

17 Claims, 5 Drawing Sheets

RANDOM SCAN SYSTEM

FIELD OF THE INVENTION

The present invention relates to data acquisition systems and more particularly to two-dimensional data acquisition systems associated with video input devices.

BACKGROUND OF THE INVENTION

It is well known to use television cameras for data acquisition applications, including inter alia, pattern recognition, tracking and image transmission. The use of television cameras for these applications involves inherent disadvantages due to the fact that the requirements of these applications are often incompatible with the basic design purposes of television camera, i.e. the display of images to the human eye.

Specifically considering applications in point target detection and tracking, television cameras have the disadvantages that the target locating rate is dependent on the relatively low frame rate of television cameras and that the sequential standard raster television scanning system provides high redundancy scanning of irrelevant areas.

SUMMARY OF THE INVENTION

The present invention seeks to overcome disadvantages of prior art two-dimensional video data acquisition systems and to provide a relatively inexpensive, high speed two-dimensional video data acquisition system based on a random scan technique. The purpose of the system is to reduce to a minimum the scanning redundancy associated with prior art systems and increase at the same time the scan detection rate of the system.

There is thus provided in accordance with a preferred embodiment of the present invention a two-dimensional video data acquisition system comprising: video detector apparatus for scanning a visual scene; controller apparatus for generating scan pattern instructions; system interface apparatus for selecting at least one scan pattern for acquisition of video data from the visual scene, the scan pattern being selected from a plurality of such patterns in accordance with the scan pattern instructions; and scan-video interface apparatus comprising random scan driver apparatus for generating scan control signals in accordance with the selected scan pattern, the video detector apparatus scanning the visual scene in accordance with the scan control signals to provide an output to the system interface such that an intensity data map is stored therein, the controller apparatus performing data processing of the intensity data map in accordance with a predetermined set of video data characterisics.

A feature of the invention is the provision of the video detector apparatus as a vidicon TV camera which is driven by scan patterns selected in either a predetermined or real-time fashion and covering selected locations of the vidicon camera plate to access two-dimensional data in the visual scene without redundant scanning.

Another feature of the invention is the storage of the scan patterns in a pattern library for selection by the controller apparatus.

Still another feature of the invention is the provision of a random access memory (RAM) for storage of the randomly accessed video information.

The invention is designed so as to be useful in several applications, including locating a target, pattern analysis and video data compression.

BRIEF DESCRIPTION OF THE DRAWINGS

The present invention will be understood and appreciated more fully from the following detailed description taken in conjunction with the drawings in which.

DETAILED DESCRIPTION OF A PREFERRED EMBODIMENT

Figure 1:
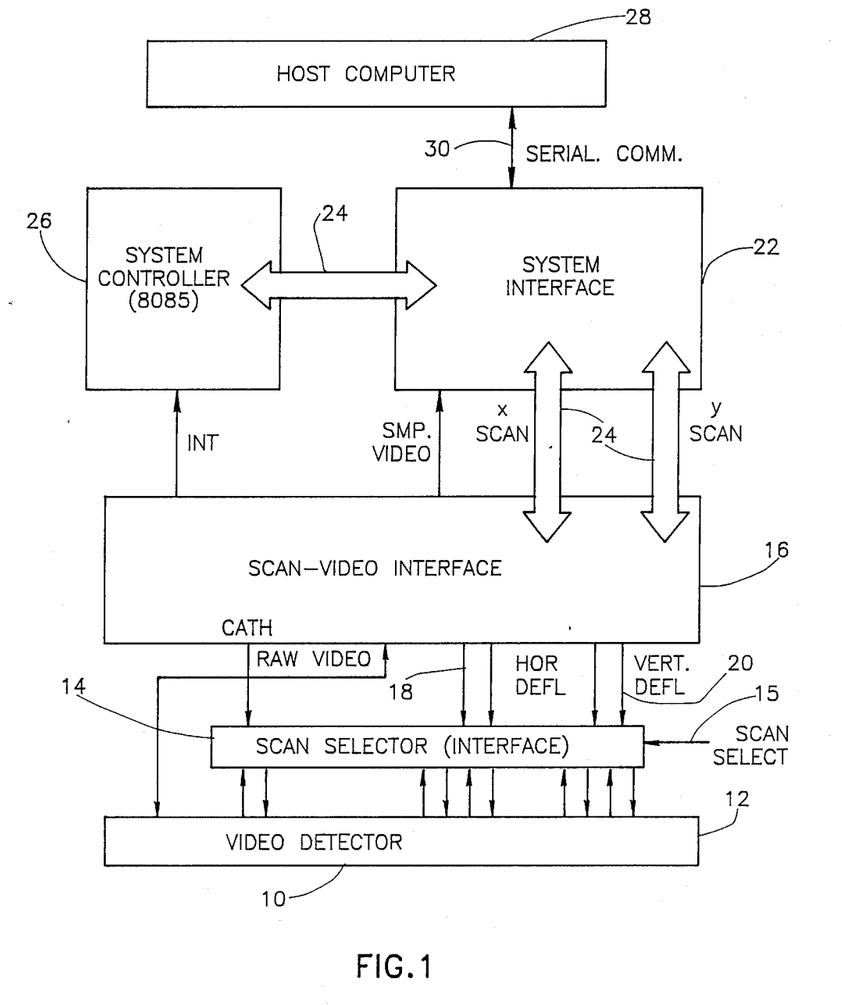
FIG. 1 is a block diagram illustration of the general architecture for a two-dimensional video data acquisition apparatus constructed and operative in accordance with a preferred embodiment of the present invention.

Reference is now made to FIG. 1, which illustrates, in block diagram form, a random scan video data acquisition system constructed and operative in accordance with a preferred embodiment of the present invention.

The random scan system comprises a video detector 10 of the scanned array type, such as a vidicon tube or a charge coupled device. The video detector 10 receives scan signals 12 from a scan selector interface 14 which is activated by a scan select signal 15 in the random scan mode. A scan-video interface 16 supplies scan selector interface 14 with horizontal and vertical deflection signals 18 and 20. A system interface 22 is in communication with the scan-video interface 16 via data bus 24. The system interface 22 communicates with a system controller 26 via another portion of data bus 24. A host computer 28 is in serial communication with the system interface 22 via data link 30.

The general operation is such that scan selector interface 14 provides scan signals 12 to video detector 10, causing it to selectably scan only a selected area of the total scene available to video detector 10. The selection is made in accordance with predetermined instructions provided by host computer 28, such as a PDP 11/44. The host computer 28 communicates with system controller 26 and is coupled to the scan-video interface 16 via system interface 22.

The system is operable to scan the scene available to video detector 10 in accordance with a strategy decided upon by host computer 28. In the case of a target locating operation, one strategy could be for host computer 28 to send a description of the target which is to be located by the random scan system. The description typically includes the approximate location of the target and its approximate size. Another strategy could be that the location of the target is known already and video data about it is desired, so that the electron beam of video detector 10 is intended to shoot directly at the location of the target in the scene.

In either case, the random scan system begins a scan of video detector 10 according to a scan strategy decided on by host computer 28. The system controller 26 translates this strategy into a required scan pattern which is one of several such patterns resident in a pattern library located in system interface 22. The scan pattern can be selected in either a predetermined or real-time fashion as a sequential combination of individual scan patterns chosen in accordance with the strategy of host computer 28.

In making this scan according to the selected scan pattern, the random scan system will respond through a sampling technique of the video data whether or not the target has been found in accordance with the scan strategy set by host computer 28. If it has been found, host computer 28 may decide to change or relocate the pattern slightly to receive more video data. If it has not been found, host computer 28 may decide to change the pattern completely. Thus, as further described herein, there is provided an interactive mode between the random scan system and host computer 28 regarding the video data obtained from the visual scene available to the video detector 10.

Figure 2:
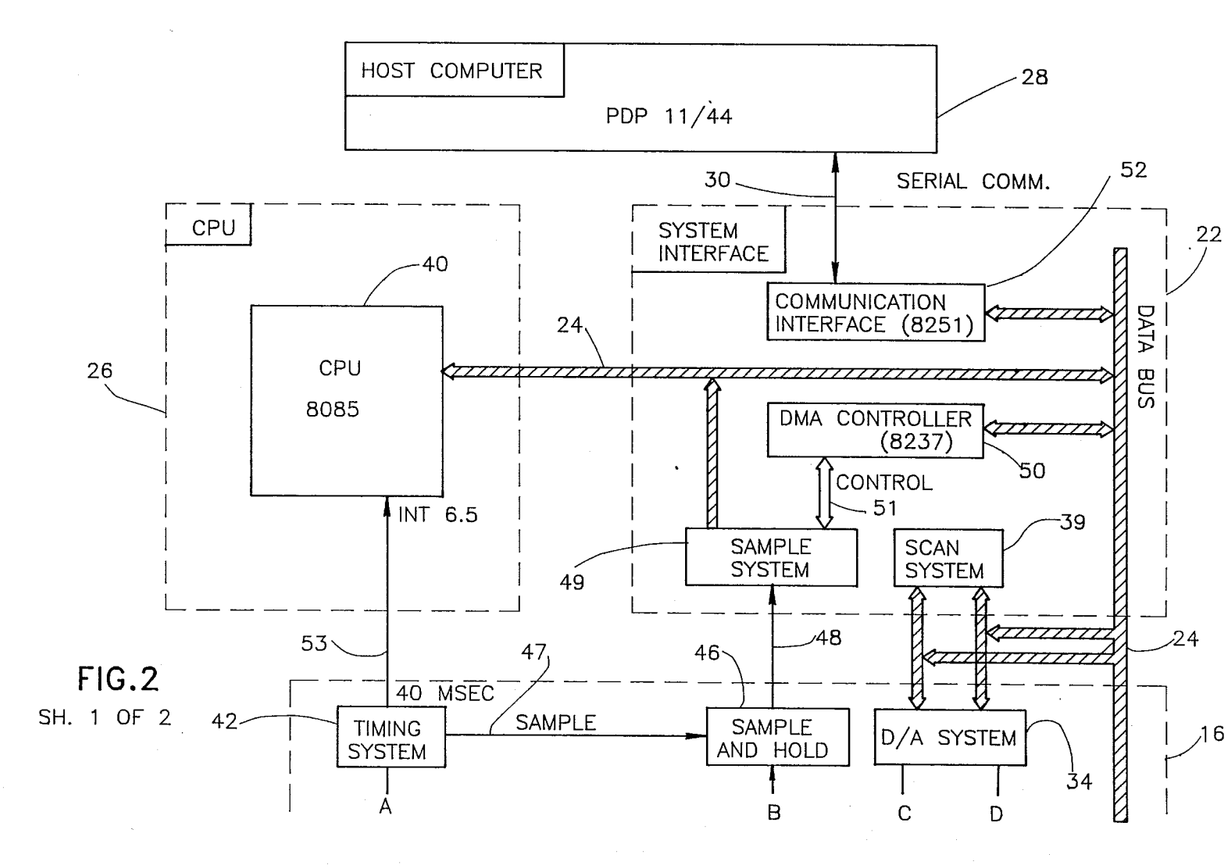
FIG. 2 is a block diagram showing further detail of the general architecture of the apparatus of FIG. 1.

Referring now to FIG. 2, a more detailed version of the general architecture of FIG. 1 is shown. The video detector 10 comprises a vidicon TV camera. The scan-video interface 16 comprises a set of deflection amplifiers 32 which provide the horizontal and vertical deflection signals 18 and 20 to scan selector interface 14. The deflection amplifiers 32 are themselves fed by a D/A system 34 which provides driver signals 36 and 38 respectively containing x and y coordinates corresponding to the instructions of host computer 28. The x and y coordinates control the shooting location of the electron beam gun in video detector 10 by operation of deflection amplifiers 32.

The system controller 26 is shown comprising a CPU based on an 8085 microprocessor. The system controller 26 performs the function of implementing the instructions which host computer 28 provides. Included in these instructions are the scan pattern to be used by video detector 10 and the x and y coordinates at which the scan pattern is to begin. In this way, the scan pattern can be one of several stored in the pattern library located in the scan system 39 of system interface 22, and only the location of the scan pattern starting point will be shifted, so that the number of stored scan patterns and hence the library size can be kept small.

When the CPU block 40 in system controller 26 selects the scan pattern and the x,y coordinates, the read-only memory (ROM) of scan system 39 is accessed and the required scan pattern is passed along with the x,y coordinates to D/A system 34 in scan-video interface 16. As described earlier, driver signals 36 and 38 from D/A system 34 will determine the operation of deflection amplifiers 32 and the aiming of the electron beam gun in video detector 10.

The aiming of the electron beam having been accomplished, a cathode enable signal 41 is sent to scan selector interface 14 by timing system 42 to initiate firing of the electron beam gun on the desired pixel of video detector 10. The visual information extracted from the pixel on the light-sensitive screen of the video detector 10 is contained in video signal 44. A sample and hold latch 46 is an analog latch which responds to the sample signal 47 provided by timing system 42 to sample and hold the value of video signal 44.

The video signal 44 stored in sample and hold latch 46 is read continuously from video sample 48 by the sample system block 49 which compares the visual information to two threshold intensity levels, one low and one high to reveal the contrasting portions of the target. The instant the visual information passes one of these two thresholds, block 49 signals the direct memory access controller (DMA) block 50 via control bus 51. This block 50 in turn immediately sends the x,y coordinates of the pixel and the video intensity level to the memory of CPU block 40 in system controller 26. There is thus created in the RAM memory of CPU block 40 a three-dimensional map P(I,x,y) of the intensity I, and the x,y location for each pixel in the scan pattern.

After one complete scan, a comparison is implemented by CPU block 40 between the contents of the intensity data map and the characteristics of the target that were initially established by host computer 28. In this way, the target is located and its coordinates are passed by the serial communications interface 52 to host computer 28.

The process above-described has a repetition rate of 40 msec as required by the refresh rate of the vidicon tube used as video detector 10. As the vidicon is a capacitance device, this is a very strict operating requirement, although with non-capacitance imaging equipment this rate is not required and the tracing speed of the system can increase significantly. This operation is controlled by the 40 msec interrupt signal 53 from timing system 42.

As mentioned earlier, various scan strategies are available for implementation by host computer 28. Examples of these for a target locating operation include a spiral scan strategy providing maximum scanned area vs. maximum position probability for a minimum displacement of the scan pattern and minimum effort to detect the target. The target locating rate is increased in proportion to the number of independent interlacing paths through the target, which is related to the target size.

Another mode of operation could be that of centering a circular scan pattern at an estimated target location or a previously known location so as to decrease the detection rate at real time. This could also be accomplished through use of an adaptive pattern density technique, whereby the pattern density is decreased with increasing target size.

Still another scan strategy is that of a Peano or Hilbert pattern, which is useful in compressing pictures and video information. The properties of these patterns are such that they will establish features of the target without the scanning redundancy of standard line-by-line scans.

Figure 3:
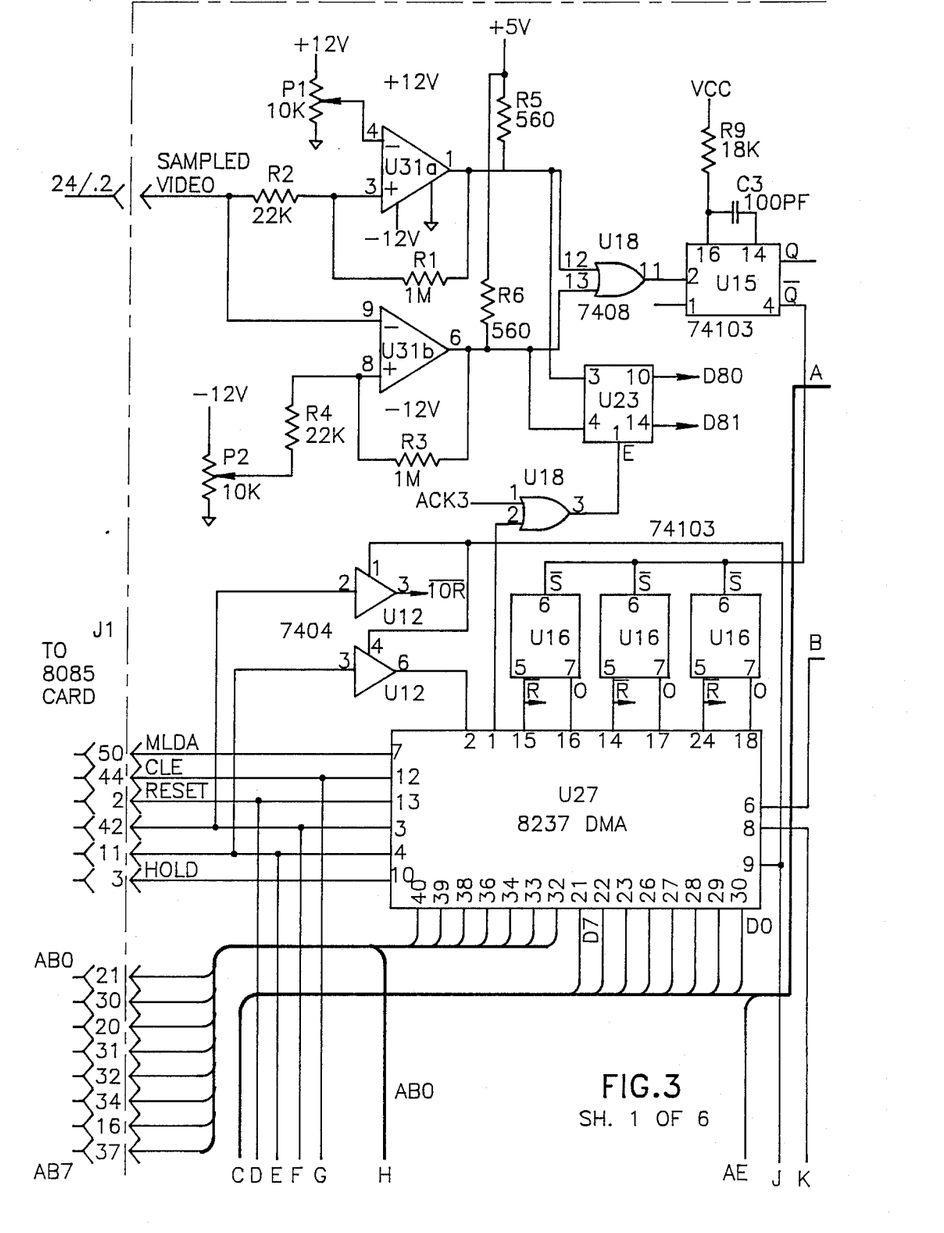
FIG. 3 is a schematic diagram of the circuitry employed in the system interface forming part of the apparatus of FIG. 1.

The system interface 22 is described in schematic form in FIG. 3. Major operating blocks of FIG. 2 are shown in their hardware component equivalents in the preferred embodiment.

The serial communications interface 52 comprises component 8251 UART. The DMA controller 50 comprises component U27. The data intensity map is stored in memory U28. The pattern library in scan system 39 comprises components U1–U3 and U24, U26. The repetition rate function of scan system 39 is determined in the hardware comprising components U4–U7 and U13. The scan system 39 function which determines the x,y location of the selected scan pattern is provided by hardware comprising components U8–U11 and U21, U22. The sample system 49 comprises components U31a, U31b, U18, U15 and U23.

Figure 4:
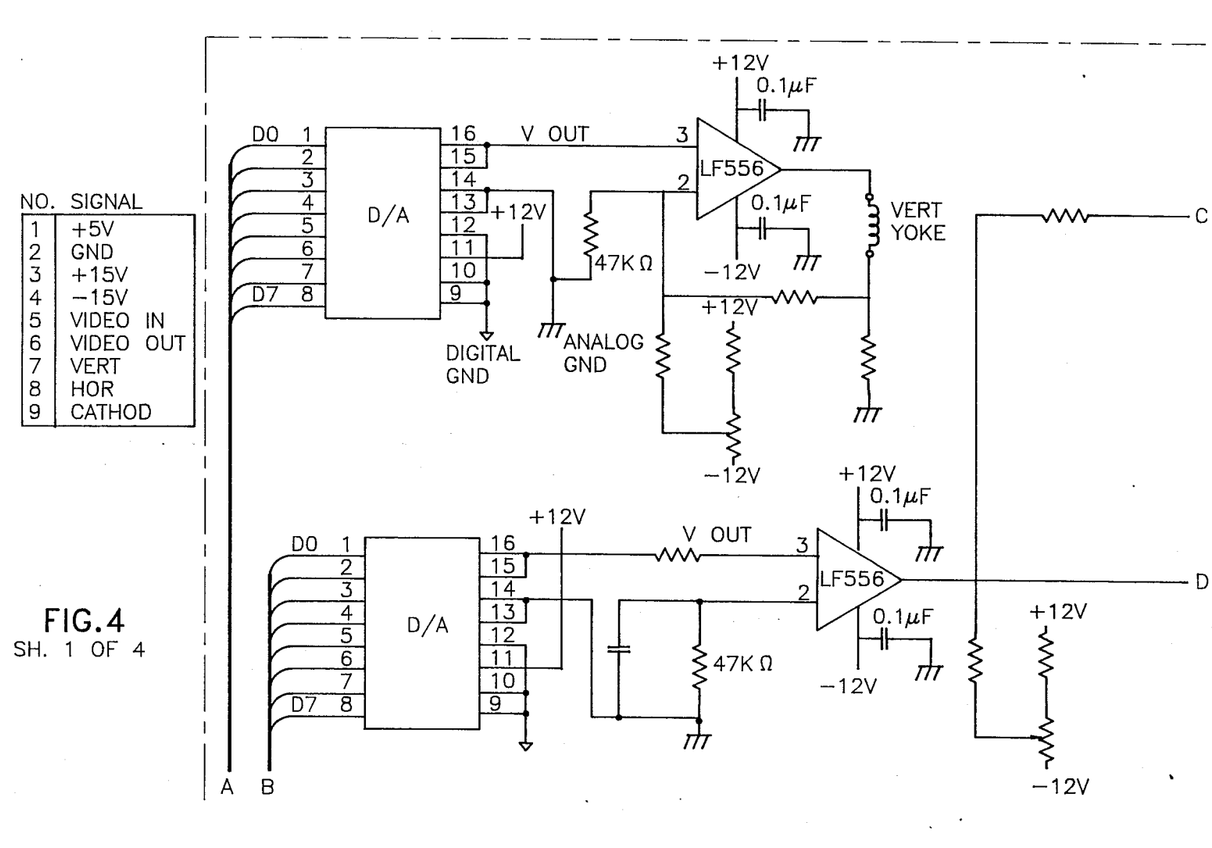
FIG. 4 is a schematic diagram of the circuitry employed in the scan-video interface forming part of the apparatus of FIG. 1.

The scan-video interface 16 is described in schematic form in FIG. 4. Major operating blocks of FIG. 2 are shown in their hardware component equivalents in the preferred embodiment.

The D/A system 34 comprises components such as digital to analog converters D/A and U4. The x,y coordinates received from system interface 22 are stored in the latches 1-4/74123. These are converted by the D/A converters and provide output deflection signals 36 and 38 which control deflection amplifiers 32 comprising components U3 and LF556. The video signal 44 received from video detector 10 is stored in sample and hold latch 46 comprising component MA-5320. The timing system 42 comprises components 12/74123.

Figure 5:
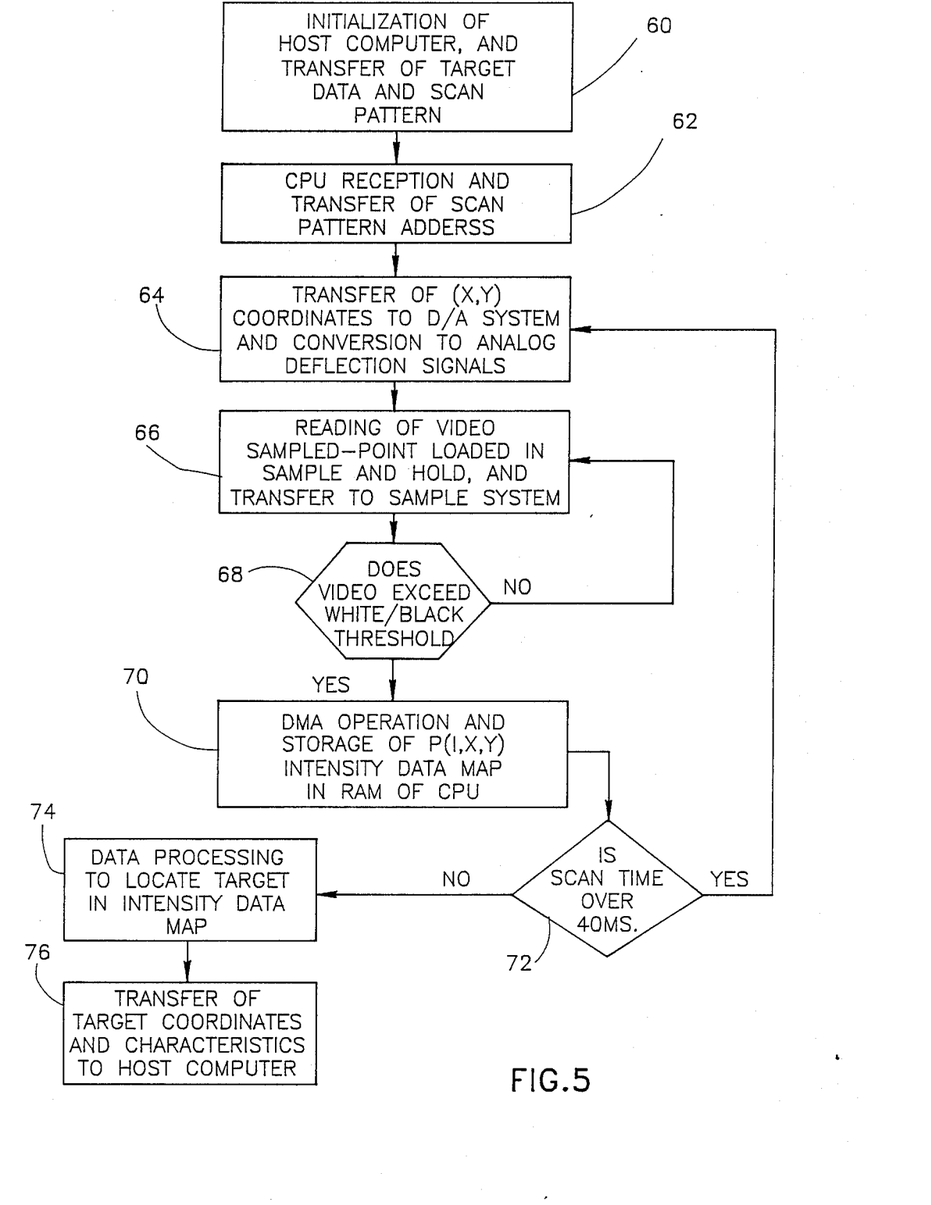
FIG. 5 is a flow chart showing the general algorithm used with the apparatus of FIG. 1.

Referring now to FIG. 5, a flow chart of the general algorithm used in a preferred embodiment of the random scan system of the present invention is shown. Block 60 is the start of the program loop which is the initialization of host computer 28. A transfer of data from host computer 28 to the CPU in system controller 26 includes the approximate target location and size as well as the selected scan pattern. In block 62 the CPU receives this data and transfers the scan pattern address in the pattern library to scan system 39.

In block 64 the x,y coordinates of the scan pattern are sent to D/A system 34. There they are converted to analog deflection signals 36 and 38 for use by deflection amplifiers 32 which deflect the electron beam of the vidicon gun in video detector 10. In block 66 the video information is read by sample and hold latch 46 and transferred to sample system 49. In decision block 68 the sampled video is compared to a threshold value.

If the video intensity does not exceed the threshold value, further data is gained in block 66. If the treshold is exceeded, in block 70 DMA controller 50 operates to create an intensity data map which stores the intensity level and the x,y coordinates of the sampled point in the RAM of the CPU in system controller 26. Decision block 72 determines whether the 40 msec scan time has passed, and if not the process continues. If is has passed, the pattern is scanned once again.

Continuation of the process after decision block 72 is carried out in block 74 wherein the intensity data map is processed to extract the location of the target. In block 76, this result is contained in x,y coordinates and characteristics which are transferred to host computer 28 in serial communication for further processing.

Thus, in accordance with the present invention, there is provided a two-dimensional video acquisition system based on a random scan technique which is operable to eliminate redundant scanning of a visual scene and obtain video information for applications such as target location, pattern analysis and video data compression.

It will be appreciated by persons skilled in the art that the present invention is not limited by what has been particularly shown and described hereinabove. Rather the scope of the present invention is defined only by the claims which follow.

We claim:

1. A two-dimensional video data acquisition system comprising:
   a video detector means for scanning a visual scene;
   a controller means for generating scan pattern instructions;
   a system interface means for selecting at least one scan pattern for acquisition of video data from said visual scene, said scan pattern being selected from a plurality of such patterns in accordance with said scan pattern instructions; and
   a scan-video interface means comprising random scan driver means for generating scan control signals in accordance with said selected scan pattern,
   said video detector means scanning said visual scene in accordance with said scan control signals to provide an output to said system interface such that an intensity data map is stored therein, said controller means performing data processing of said intensity data map in accordance with a predetermined set of video data characteristics,
   wherein said system interface comprises a read only memory (ROM), a sample system, a random access memory (RAM), a direct memory access controller (DMA), and a serial communication interface.

2. The system of claim 1 wherein said video detector means comprises a vidicon TV cameras.

3. The system of claim 1 wherein said controller means comprises a CPU which receives a scanning strategy for generating said scanning instructions.

4. The systems of claim 1 wherein scan pattern instructions are generated in a predetermined fashion.

5. The system of claim 1 wherein said scan pattern instructions are generated in a real-time fashion.

6. The system of claim 1 wherein said ROM provides storage of a pattern library in which said scan patterns are contained.

7. The system of claim 1 wherein said sample system compares the video output intensity of said video detector to a predetermined threshold value.

8. The system of claim 1 wherein said RAM and DMA provide said intensity data map storage in accordance with the operation of said sample system.

9. The system of claim 1 wherein said serial communication interface provides communication with a host computer for transfer of a scanning strategy to said CPU.

10. The system of claim 1 wherein said scan-video interface comprises a D/A converter and deflection amplifiers for generating said scan control signals.

11. A method of acquiring two-dimensional video data from a portion of a visual scene, said method comprising the steps of:
    determining the portion of the visual scene from which data is to be acquired;
    selecting at least one scan pattern for a video detector from a plurality of such patterns in accordance with said determined scene portion;
    scanning said video detector in accordance with said selected scan pattern;
    sampling the video data received from said video detector and storing a portion thereof in accordance with a predetermined intensity threshold value; and
    processing said stored video data portion in relation to a predetermined set of video data characteristics,
    wherein said sampling and storing step is performed by a sampling system in cooperation with a direct memory access controller (DMA) and a random access memory (RAM).

12. The method of claim 11 wherein said determining step is performed in accordance with a scanning strategy established by a host computer.

13. The method of claim 11 wherein said selecting step is performed by a CPU which selects said scan pattern from a read only memory (ROM) in accordance with said scanning strategy.

14. The method of claim 11 wherein said selecting step is performed in a predetermined fashion.

15. The method of claim 11 wherein said selecting step is performed in a real-time fashion.

16. The method of claim 11 wherein said scanning step is performed by a D/A converter and deflection amplifiers.

17. The method of claim 11 wherein said processing step is performed by said CPU in serial communication with said host computer.

* * * * *